United States Patent
Schabert

[11] 3,775,251
[45] Nov. 27, 1973

[54] SAFETY DEVICE FOR PRESSURE VESSELS, PARTICULARLY OF THE TYPE ASSOCIATED WITH NUCLEAR REACTORS

[75] Inventor: Hans-Peter Schabert, Erlangen, Germany

[73] Assignee: Siemens Aktiengesellschaft, Berlin and Munchen, Germany

[22] Filed: Sept. 3, 1971

[21] Appl. No.: 177,552

[30] Foreign Application Priority Data
Sept. 8, 1970 Germany.................. P 20 44 304.3

[52] U.S. Cl....................... 176/87, 52/249, 176/38, 220/3, 220/9 A
[51] Int. Cl............................................ G21c 13/00
[58] Field of Search .................. 176/87; 220/3, 9 A; 52/249

[56] References Cited
UNITED STATES PATENTS

| 3,578,564 | 5/1971 | Fletcher | 176/87 |
| 3,121,046 | 2/1964 | Trickett et al. | 176/87 |
| 3,438,857 | 4/1969 | Sulzer | 176/87 |
| 3,367,839 | 2/1968 | Chinaglia | 176/87 |
| 3,182,000 | 5/1965 | Benzler | 176/87 |
| 2,983,659 | 5/1961 | Treshow | 176/87 |

Primary Examiner—Reuben Epstein
Attorney—Edwin E. Greigg

[57] ABSTRACT

As a safety measure relating to pressure vessels of nuclear reactors, there is provided a safety tank surrounding the pressure vessel at least in its upper range and a guard ring overlapping the upper edge of the safety tank. The guard ring is disconnectably secured by means of bolts extending within the safety tank to a carrier ring situated under the nipples of the pressure vessel.

20 Claims, 3 Drawing Figures

//3,775,251

SAFETY DEVICE FOR PRESSURE VESSELS, PARTICULARLY OF THE TYPE ASSOCIATED WITH NUCLEAR REACTORS

BACKGROUND OF THE INVENTION

Due to the increasing size in the pressure vessels of nuclear reactors and due to the tendency of establishing, in an increasing number, nuclear reactors in or in the vicinity of densely populated areas, in designing safety measures for the nuclear reactors, accidents due to a sudden rupture of the reactor pressure vessel have to be given prime consideration.

In this connection a number of measures have already been proposed. Thus, for example, according to one proposal, the cover of the reactor pressure vessel is held in place, even in case of the rupture of all the securing bolts, by virtue of a securing structure or a second securing cover. Such safety structures, however, offer protection only against the rupture of the reactor cover and not against a rupture of the pressure vessel proper. Further, the aforenoted securing devices are voluminous and heavy to such an extent that their manufacture and shipment present extraordinary difficulties.

OBJECT, SUMMARY AND ADVANTAGES OF THE INVENTION

It is an object of the invention to provide an improved safety device for the aforenoted purpose which requires relatively small work and material input and which protects in a secure manner against a rupture of at least the most endangered portions of a pressure vessel.

Briefly stated, according to the invention, there are provided a safety tank surrounding at least the upper range of the pressure vessel and a guard ring overlapping the bolts of the pressure vessel and the upper edge of the safety tank. The guard ring is disconnectably secured to a support mechanism disposed under the inlet and outlet nipples of the pressure vessel by means of tightening members extending inside the safety tank.

Thus, the particularly endangered portion of the pressure vessel is surrounded by a safety tank, whereby an increased protection is provided against components that may be hurled outwardly upon a rupture of the pressure vessel or the cover bolts and also, the outflow rate of the coolant is limited. Furthermore, by providing the guard ring and the tightening members (which may be formed as tension bolts) inside the safety tank, the bending moment is reduced, because the diameter of the circle along which the bolts for the guard ring are disposed, is smaller than the upper portion of the safety tank.

The invention will be better understood as well as further objects and advantages become more apparent from the ensuing detailed specification of a preferred, although exemplary, embodiment of the invention taken in conjunction with the drawing.

DESCRIPTION OF THE PREFERRED EMBODIMENT

Figure 1:
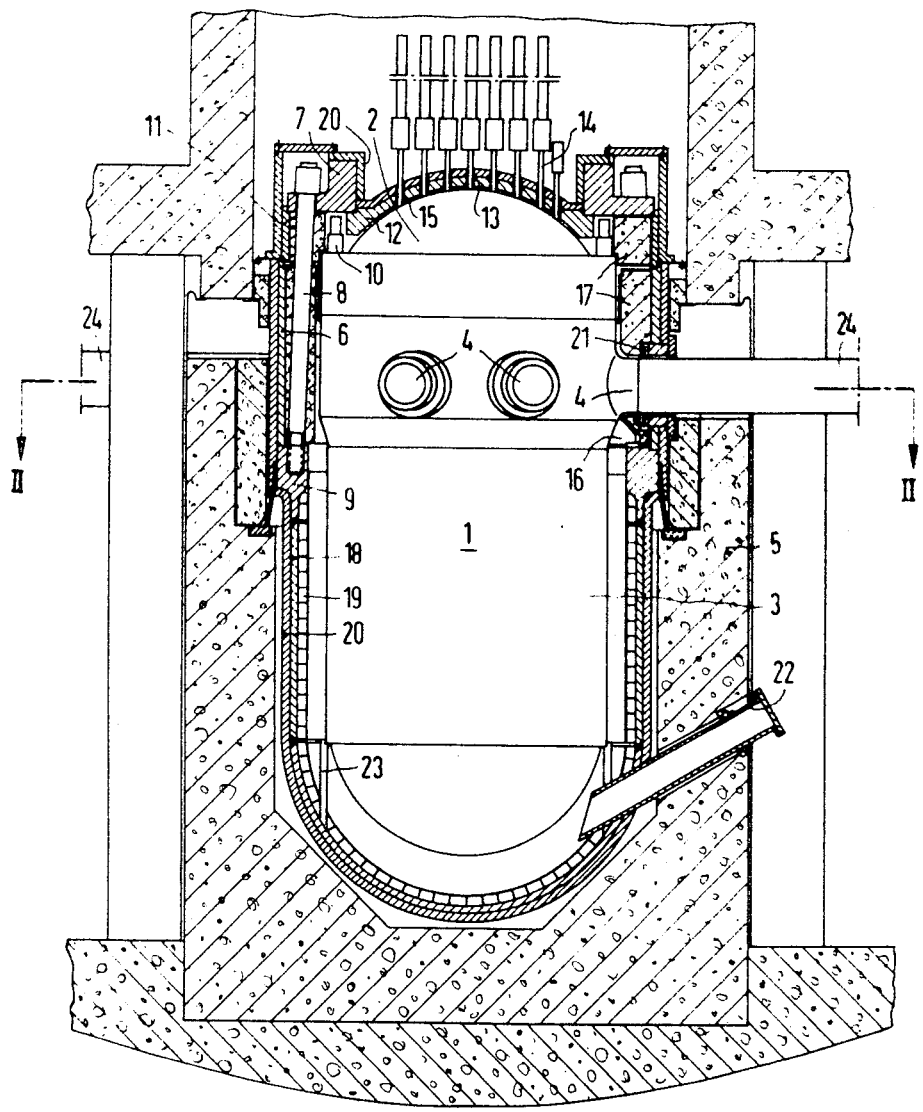
FIG. 1 is a schematic longitudinal sectional side elevational view of a pressure vessel incorporating the preferred embodiment of the invention.
Figure 2:
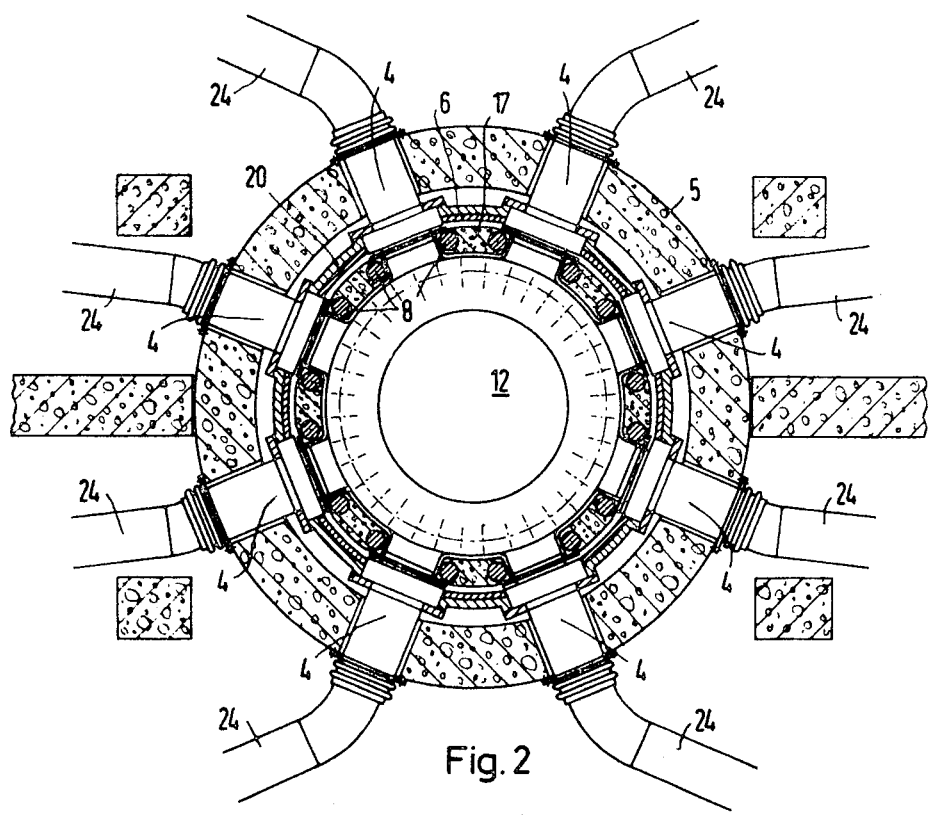
FIG. 2 is a sectional view along line II-II of FIG. 1.
Figure 3:
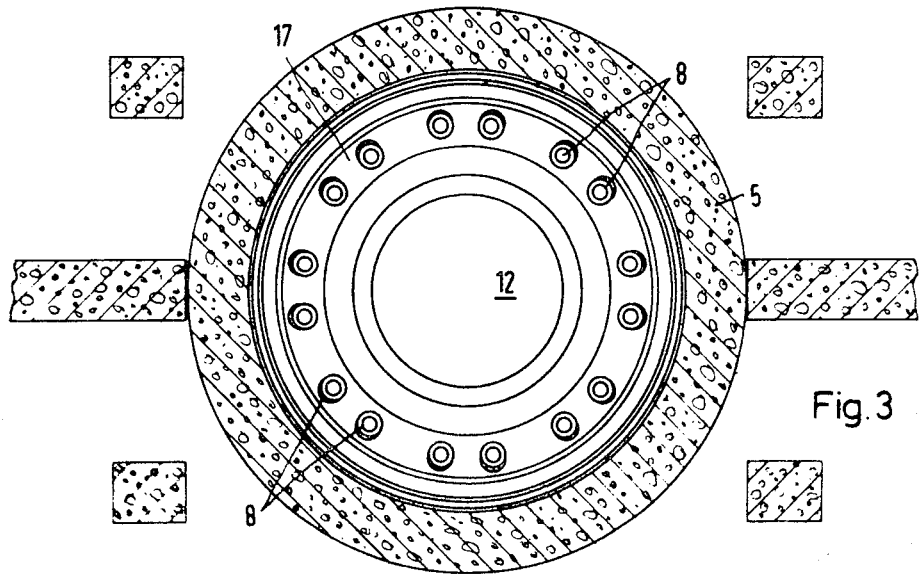
FIG. 3 is a top plan view of the pressure vessel incorporating the preferred embodiment.

Turning now to the Figures, the pressure vessel 1 proper of the nuclear reactor comprises a spherically arcuate cover 2 and a cylindrical lower part 3 provided with inlet and outlet nipples 4 to which there are connected tubular conduits 24 for the introduction and withdrawal of the reactor coolant. The pressure vessel 1 is surrounded by a concrete cylinder 5 which serves as a biological shield. According to the invention, the pressure vessel 1 is at least at its upper range surrounded at a predetermined distance by a safety tank 6, 11, the internal diameter of which, for facilitating assembly, is expediently somewhat greater than the greatest diameter of the pressure vessel 1 measured across the coolant nipples 4. Above the pressure vessel bolts 10 there is arranged a guard ring 7 which overlaps the bolts 10 and the upper edge of the safety tank 6, 11. The guard ring 7 is disconnectably secured by tightening means formed of bolts 8 extending within the safety tank 6, 11 to a carrier ring 9 situated under the nipples 4. Expediently, the bolts 8 are downwardly and outwardly divergent from the longitudinal axis of the assembly. It is also feasible to anchor the bolts 8 directly in the concrete cylinder 5.

It is noted that the guard ring 7 is designed so that a cross sectional portion thereof with more than half of the bending resistance is situated within the circle along which the bolts are disposed. In this manner the guard ring 7 may be of reduced weight while being able to withstand the same loads.

For the purpose of reducing the shipping weight of the safety tank and for facilitating its handling at the construction site, the upper part of the safety tank 6, 11 is expediently made of a loosely positioned cylindrical casing 11 which may be tightened to the guard ring 7 so that it is removable therewith as a unit. The mid portion 6 of the safety tank 6, 11 may sit loosely on the carrier ring 9 or may be fixedly attached thereto. It is noted, however, that it is feasible to make the safety tank 6, 11 as a single cylindrical component.

It may be further advantageous to provide over the vessel cover 2 a guard cover 12 held down by the guard ring 7. For example, in boiling water reactors, the guard cover 12 may be made as one piece with the guard ring 7, or in pressurized water reactors it may be supported separately and provided with openings 13 for the control bar guides 14. It may be advantageous if the guard cover 12 extends only over the area inside the circle along which the bolts 10 are located to permit its removal together with the vessel cover 2. Further, between the guard cover 12 and the pressure vessel cover 2 there may be provided a free space constituting an overflow clearance 15.

In order to prevent damaging of the clamping bolts 8 and the outer safety tank 6, 11 by flying debris upon rupture of the pressure vessel, the freedom of motion of the vessel debris may be substantially limited by means of inserted filler components 17 which are inserted from above between the pressure vessel 1 and the safety tank 6, 11 and which may be made of cast iron or heavily reinforced or steel-clad concrete blocks.

For the protection of the lower portion of the pressure vessel 1 as well, the latter may be surrounded by a lower safety tank part 18 which may be in a close contacting relationship with the pressure vessel 1 or, for permitting the performance of repetition tests, it may be situated spaced therefrom. In order to limit the impact effect of the flying debris in case of a spacedly arranged safety tank part 18, it is advantageous if the intermediate space between the component 18 and the pressure vessel 1 below the carrier ring 9 is filled with a steel rib structure 19. The carrier ring 9 may be fixedly connected with the lower safety tank part 18 as shown in FIG. 1.

The individual components of the safety tank, including the guard cover 12, may be made of a simple ductile steel in the shape of sheets or cast steel rings. The safety tank components 18 and 6, as well as the guard ring 7 and the guard cover 12 are provided at their outer side with an insulation 20, so that the safety tank reaches approximately the reactor temperature whereby its ductility is substantially increased. The amount of radiation is, by virtue of the shielding effected by the pressure vessel proper so small that an embrittlement does not occur.

It is, however, feasible to omit the steel lower part 18 of the safety vessel without thereby eliminating the protection of the pressure vessel in its lower range. Such a result is achieved by designing the concrete cylinder 5 as a concrete pressure container. In such a case the carrier ring 9 is either secured to, or embedded in the concrete cylinder 5, or its function is taken over by the concrete pressure container itself in such a manner that the tightening bolts 8 transmit their forces to the axial tensioning member or reinforcing means, as the case may be.

In order to prevent a displacement of the pressure vessel 1 inside the concrete cylinder 5 in case of a rupture, it is expedient to support the pressure vessel 1 not only by claws 16 which engage the carrier ring 9 and the pressure vessel 1 below the nipples 4, but also by additional high-strength supports 23 which are situated below the pressure vessel 1. In case of a transversal rupture, the liberated axial forces are taken up by these lower, circumferentially extending supports 23. In the presence of these measures, any shift in the pressure vessel 1 is so small that the core carrying structure and thus the reactor core are not significantly deformed. The safety tank is so designed that it resists the saturation vapor pressure in the hot branch of the reactor coolant. In the instant immediately following a rupture, the higher operational pressure of the reactor immediately drops due to the fact that a small quantity of elastically compressed water escapes through the overflow clearance 15 between the cover 2 of the pressure vessel 1 and the guard cover 12. In order to further prevent that in case of a rupture in the pressure vessel, the outflow rate of the coolant in the range of the main coolant nipples 4 is unpermissibly high, the corresponding outflow passage sections may be decreased by piston rings 21 which, in an emergency, may shift with the associated nipples.

If the reactor fuel has to be replaced, the guard ring 7 is lifted out as a unit with the associated cylindrical casing 11 of the safety tank and the associated insulation 20, together with the upper filler stones 17. If a guard cover 12 is present in the structure, it remains positioned on the reactor cover 2. During repetition tests, the guard cover 12 may be either lifted only about 40 centimeters upwardly or, after assembling the control rod drive means 14, may be entirely removed. Additionally, the filler stones 17 in the range of the nipples 4 are taken out to permit a removal of the bolts 8 of the guard ring 7. The repetition test of the lower spherical bottom of the pressure vessel 1 occurs, in case the lower portion 18 of the safety tank is situated in a spaced manner, from the outside with the aid of a particular device through a pressure-resistant oblique conduit 22 which passes through the biological shield 5 and the safety tank portion 18.

By means of the aforedescribed safety device in the form of a safety tank which entirely or partially surrounds the pressure vessel proper, the consequences of a rupture in the reactor pressure vessel may be substantially suppressed in a simple manner.

It is to be understood that the basic principle of the invention may also find application in other pressure vessels, where the cover is arranged laterally or at the base and which serve for storing a material under high pressure.

What is claimed is:

1. In a safety device for a pressure vessel, the latter including circumferentially arranged inlet and outlet nipples and a removable cover secured to the pressure vessel by cover bolts arranged along a circle, the improvement comprising
   A. a safety tank spacedly surrounding at least an upper terminal portion of said pressure vessel including the range of said nipples, said safety tank being normally isolated from the pressure prevailing in said pressure vessel, said safety tank having an upper edge,
   B. a guard ring essentially overlapping said upper edge of said safety tank and said cover bolts,
   C. a support means surrounding said pressure vessel below said nipples and
   C. tightening members disconnectably fastening said guard ring to said support means, said tightening members being arranged along a circle and extending within said safety tank.

2. An improvement as defined in claim 1, wherein the cross section of said guard ring is such that more than one half of its bending resistance is within the circle along which said tightening means are disposed.

3. An improvement as defined in claim 1, wherein the upper portion of said safety tank is formed of a cylindrical casing loosely sitting on a mid portion of said safety tank and being directly affixed to said guard ring.

4. An improvement as defined in claim 1, wherein said tightening members associated with said guard ring are outwardly divergent.

5. An improvement as defined in claim 4, wherein said tightening members are formed as tension bolts.

6. An improvement as defined in claim 1, including a guard cover situated above said removable cover within the circle along which said cover bolts are arranged, said guard cover including an outer marginal range overlapped by said guard ring.

7. An improvement as defined in claim 6, wherein said guard ring and said guard cover constitute a jointly removable unit.

8. An improvement as defined in claim 1, wherein said support means is formed as a carrier ring.

9. An improvement as defined in claim 8, including a concrete cylinder surrounding said pressure vessel and formed as a concrete pressure container, said carrier ring being embedded in said concrete cylinder.

10. An improvement as defined in claim 1, including a concrete cylinder surrounding said pressure vessel and formed as a concrete pressure container, said tightening means being directly anchored in said concrete cylinder.

11. An improvement as defined in claim 1, including a safety tank portion surrounding said pressure vessel below said nipples and below said support means.

12. An improvement as defined in claim 11, wherein said safety tank portion is in a face-to-face engagement with said pressure vessel.

13. An improvement as defined in claim 11, wherein said safety tank portion spacedly surrounds said pressure vessel, said improvement includes a steel rib structure at least partially filling the space between said safety tank portion and said pressure vessel below said support means.

14. An improvement as defined in claim 1, wherein said support means is formed as a carrier ring constituting one part of said safety tank.

15. An improvement as defined in claim 11, wherein said support means is formed as a carrier ring constituting one part of said safety tank portion.

16. An improvement as defined in claim 1, including removable protective filler members disposed in the range of said tightening members between said safety tank and said pressure vessel on the one hand and said guard ring and said support means on the other hand.

17. An improvement as defined in claim 6, including a safety tank portion surrounding said pressure vessel below said nipples and below said support means; said safety tank, said safety tank portion, said guard ring and said guard cover are provided with external insulating means.

18. An improvement as defined in claim 6, including an overflow clearance provided between said vessel cover and said guard cover.

19. An improvement as defined in claim 1, including
A. a concrete cylinder surrounding said pressure vessel,
B. a safety tank portion surrounding said pressure vessel below said nipples and below said support means and
C. a pressure-resistant oblique conduit passing through said concrete cylinder and said safety tank portion and merging into the space below said pressure vessel.

20. An improvement as defined in claim 1, including additional support means engaging lower outer portions of said pressure vessel.

* * * * *